Patented Nov. 11, 1952

2,617,755

UNITED STATES PATENT OFFICE 2,617,755

ANTIBIOTIC PRODUCTION FROM STREPTOMYCES GRISEO-CARNEUS

Robert G. Benedict and Frank H. Stodola, Peoria, Ill., assignors to the United States of America as represented by the Secretary of Agriculture No Drawing. Application May 22, 1950, Serial No. 163,572

5 Claims. (Cl. 195—80)

(Granted under the act of March 3, 1883, as amended April 30, 1928; 370 O. G. 757)

The invention herein described may be manufactured and used by or for the Government of the United States of America for governmental purposes throughout the world without the payment to us of any royalty thereon.

This invention relates to antibiotic substances and, more particularly, to a novel antibiotic, hydroxystreptomycin and its dihydro derivative, and to processes for preparing the same by cultivation of the microorganism *Streptomyces griseocarneus*. This organism was first isolated from the soil and characterized by R. G. Benedict in 1949.

The organisms known to produce streptomycin are strains of *Streptomyces griseus* and to a lesser extent, *Streptomyces bikiniensis*. Of these, certain strains of *Streptomyces griseus* are the only organisms known to produce satisfactory yields of streptomycin.

The organism employed in carrying out our invention, *Streptomyces griseo-carneus* is markedly distinguished from *S. griseus*, both morphologically and by gross appearance. It resembles more closely *S. griseolus*, an organism which is not known to produce antibiotic products.

Our relatively novel organism, when cultivated in a suitable nutrient medium, elaborates a streptomycin-like substance which may be isolated from the resulting culture medium. This substance is thermostable, soluble in water, alcohol and dilute acids, and produces the same bacteriostatic spectra that characterizes streptomycin. It is, nevertheless, chemically distinct from known types of streptomycin, and we have termed it hydroxystreptomycin.

It has the following structural formula:

may be termed the streptidine, streptose and glucosamine portions, respectively. Our new compound differs from streptomycin in the streptose portion, that portion of the streptomycin molecule being as follows:

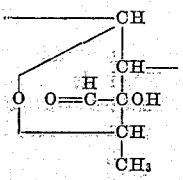

The morphological characteristics of *S. griseocarneus* are as follows.

Straight filaments in aerial mycelium, long single closed spirals. Mycelium 0.5–0.8 microns wide. Conidia, elongate, oval 1.0–1.2 microns long.

Colony formation on Bennett's agar: Variable colony types, ranging from small white to grayish white circular type with superficial colorless droplets to large gray white type with raised center and radiating striations, whose submerged mycelium is well extended from raised aerial portion.

*Gelatin.*—Rapid growth and complete liquefaction by the eighth day at 24°, 30°, or 37° C.

*Nutrient agar slant.*—Moderate growth with grayish white aerial mycelium.

*Nutrient dextrose agar.*—Growth abundant, grayish white, raised aerial mycelium.

*Tyrosine glycerol broth.*—Growth slow, medium changed from colorless to peach or light amber, indicating slight tyrosinase activity.

*Potato slant.*—Raised dirty white wrinkled aerial growth, turning brownish black, dark brown soluble pigment.

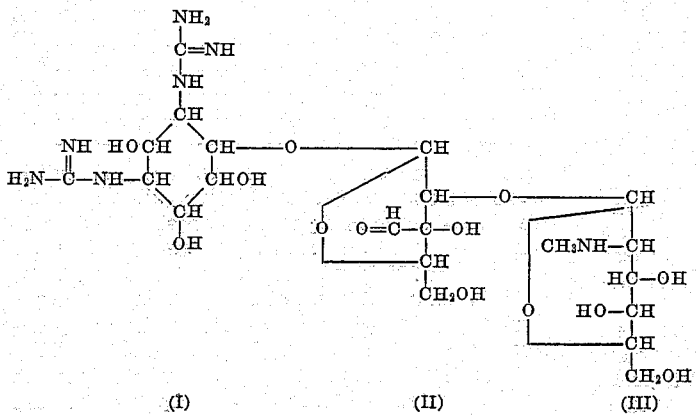

(I)          (II)          (III)

The above formula contains three major structural units or portions labeled I, II and III, which

*Nitrate to nitrites.*—Negative.

*Calcium-1-malate agar.*—Growth scant, single colonies gray with yellowish-brown centers.

*Litmus milk.*—Abundant growth became alkaline and peptonized at 4 days. No coagulation.

*Synthetic agar.*—(Czapek's) No growth.

*Loeffler blood serum.*—Grayish yellow glistening colonies; aerial mycelium scant. Liquefaction doubtful.

*Nutrient broth.*—Granular growth, broth turning light brown. No surface growth.

*Peptone iron agar.*—Intense black soluble pigment formed. Hydrogen sulfide formation questionable.

*Bennett's agar.*—Abundant grayish white aerial mycelium becoming gray and changing to flesh color in about 15 days. Numerous conidia present but submerged in mycelium.

*Carvajal oatmeal agar.*—Grayish yellow aerial mycelium, turning flesh color at 15 days. Numerous conidia formed.

*Temperature requirements.*—Minimum 24° C.; optimum from 30°–37° and maximum 42° C.

Utilization of salts of organic acids and various carbohydrates as sources of growth in Pridham and Gottlieb synthetic agar (J. Bact. 56, 107–114, 1948).

The following compounds were utilized for growth: Maltose, DL-inositol and calcium succinate. Negative results were obtained with L-xylose, L-arabinose, rhamnose, D-galactose, sucrose, raffinose, inulin, D-mannitol, D-sorbitol, dulcitol, salicin, sodium acetate and sodium citrate.

*Habitat.*—Isolated from soil of pine forest, sampled in Tiba prefecture, near town of Namihana, province of Kanto, Japan.

For production of hydroxystreptomycin the culture medium employed may vary widely. The organism requires an assimilable carbon source, an assimilable nitrogen source and inorganic nutrient salts. The carbon source may be a carbohydrate or carbohydrate derivative. For reasons of economy and convenience we prefer to employ glucose or commercially available products containing glucose, molasses or molasses residues. We may employ as the source of assimilable nitrogen such proteinaceous materials as soybean meal, corn steep liquor, distillers' dried solubles, peptone, yeast autolysate, and the like. We have obtained very good results with soybean meal and prefer to use that material because of its abundance.

The fermentation is carried out under submerged aerobic conditions. In shaken flask cultures the organism produces good yields, of the order of 300–600 micrograms of hydroxystreptomycin per milliliter of medium. The period of cultivation is 3–6 days, the optimum time being about 3 days. The temperature of cultivation should lie within the range of 25°–35° C. for best results. Although the peak yield appears to occur in about 3 days, we have found that the yield does not fall off rapidly but stays constant for periods up to 6 days. The culture medium containing hydroxystreptomycin possesses bacteriostatic properties which inhibits *S. griseo-carneus* itself after about the sixth day of incubation.

The hydroxystreptomycin may be recovered from the culture medium by adsorption upon carbon and subsequent elution. The elution is preferably carried out with alcohol acidified with a mineral acid. The following examples illustrate methods of carrying out the present invention.

EXAMPLE 1

An aqueous medium was prepared having the following composition:

|   | Percent |
|---|---|
| Soybean meal | 2 |
| Distillers' dried solubles | 0.5 |
| Glucose | 1.5 |
| Calcium carbonate | 0.1 |
| NaCl | 0.5 |

This medium was sterilized and inoculated with germinated spores of *S. griseo-carneus*, and the culture agitated and aerated for 3 days. At the end of this time the culture liquor was separated from the mycelial growth and treated with adsorbent carbon. The carbon was washed and eluted with acidified ethanol. The antibiotic was recovered from the eluate by evaporation, further purified by chromatographic methods and recovered as a white solid, with an activity corresponding to that of crystalline streptomycin sulfate. When tested against various test organisms, the antibiotic exhibited a bacteriostatic spectrum substantially identical with streptomycin.

A characteristic spectrum for hydroxystreptomycin is shown in Table I. *S. griseo-carneus* was streaked across the center of two different agar plate mediums and allowed to grow for 4 days at 30° C. Twelve test organisms were then streaked perpendicular to the line of growth of the streptomyces, and the distances of inhibition measured, after 1 day at 37° C.

*Table I*

|   | NRRL | Mm. Inhibition | |
|---|---|---|---|
|   |   | Medium No. 1 | Medium No. 2 |
| *Pseudomonas aeruginosa* | B-25 | 20+ | 10 |
| *Bacillus subtilis* P | B-971 | 30+ | 33 |
| *B. subtilis* (streptothricin resistant) | B-972 | 30–33 | 17–19 |
| Bodenheimer organism (streptomycin resistant) | B-962 | 0 | 0 |
| *Aerobacter aerogenes* | B-199 | 30+ | 24 |
| *Condida albicons* | Y-477 | 20+ | 13 |
| *Staph. aureus* | B-313 | 25+ | 20–25 |
| *Esch. coli* | B-766 | 30 | 17–23 |
| *Brucella bronchiseptica* | B-140 | 25 | 13 |
| *Staph. aureus* (streptomycin resistant) | B-313-R | 0–3 | 0 |
| *Mycobacterium smegmatis* | B-612 | 35+ | 35 |
| *Sarcina lutea* | B-1018 | 20+ | 23–27 |

EXAMPLE 2

An aqueous medium was prepared having the following composition:

|   | Percent |
|---|---|
| Soybean meal | 2 |
| Distillers' dried solubles | 0.5 |
| Sodium chloride | 0.5 |
| Calcium chloride | 0.1 |
| Dextrose | 1.5 |

This medium was inoculated with a germinated spore suspension of *Streptomyces griseo-carneus*, NRRL B-1068 and agitated in shaken flask cultures for several days. Assays were made after 72, 96, and 120 hours fermentation. The results of this example are tabulated below. Assays were made by a disc agar plate method employing *Staphylococcus aureus* NRRL B-313 (FDA No. 209-P) as the test organisms. Assay values were determined in micrograms of streptomycin base by evaluating the unknown preparations against a series of standards prepared from the FDA streptomycin A working standard with an assigned potency of 800 micrograms streptomycin base per milligram.

*Table II*

| Organism | Assay (micrograms per ml. streptomycin base) | | |
|---|---|---|---|
| | 72 hrs. | 96 hrs. | 120 hrs. |
| NRRL B-1068 | 260 | 401 | 387 |
| NRRL B-1068-(15)[1] | 587 | 650 | 492 |
| NRRL B-1068-(G)[1] | 516 | 651 | 464 |
| NRRL B-1068-(J)[1] | 428 | 660 | 321 |

[1] Strain selection—single colony isolates.

The purification of hydroxystreptomycin as obtained in the foregoing examples is carried out as follows. The crude culture liquor, after addition of a filter aid, is filtered to remove the mycelium, and the filtrate is treated with an adsorbent carbon and stirred for 30 minutes. The carbon is removed by filtration and washed with water, 50 percent methanol, and finally with 50 percent ethanol. The hydroxystreptomycin is then eluded from the carbon with methanol containing 1 percent concentrated hydrochloric acid. The eluate gives a precipitate of crude hydroxystreptomycin hydrochloride upon addition to acetone.

This product may be further purified by column chromatography using alumina as the adsorbent. The hydroxystreptomycin hydrochloride thus obtained was about 80 percent pure.

Pure hydroxystreptomycin was obtained as the trihydrochloride as follows. The material of 80 percent purity in aqueous solution was reacted with the sodium salt of helianthine, whereupon crystals of hydroxystreptomycin helianthate were formed. These crystals are removed, washed with water and recrystallized from hot methanol solution.

Analysis—

Found: C, 50.1; H, 5.71; N, 15.3; S, 6.40.
Calc'd. for $C_{21}H_{39}N_7O_{13} \cdot 3C_{14}H_{15}N_3O_3S$: C, 49.99; H, 5.59; N, 14.81; S, 6.36.

The hydroxystreptomycin helianthate, on treatment with methanol containing hydrogen chloride was converted to the pure trihydrochloride, with the following analysis:

Analysis—

Found: C, 35.8  H, 6.12  N, 13.9  Cl, 14.8.
           35.4     5.79
Calc'd. for $C_{21}H_{39}N_7O_{13} \cdot 3HCl$ (hydroxystreptomycin trihydrochloride): C, 35.68; H, 5.99; N, 13.87; Cl, 15.05.
Calc'd. for $C_{21}H_{39}N_7O_{12} \cdot 3HCl$ (streptomycin trihydrochloride): C, 36.50; H, 6.13; N, 14.19; Cl, 15.40.

The optical rotation of hydroxysteptomycin trihydrochloride is $[\alpha]_D^{27} = -95°$ compared with $[\alpha]_D^{25} = -86°$ reported for streptomycin trihydrochloride.

Degradation of hydroxystreptomycin produces streptidine and N-methyl-1-glucosamine components identical with those given by streptomycin. However, the third degradation product is a hydroxylated maltol, whereas streptomycin gives maltol. Furthermore, streptomycin reacts with methanol containing dry hydrogen chloride to give in good yield the crystalline alpha-methyl pentaacyl dihydrostreptobiosaminide, M. P. 194° C. Hydroxystreptomycin, under identical conditions, yields a crystalline compound containing methoxyl groups and combined nitrogen, M. P. 120° C.

Hydroxystreptomycin can be resolved chromatographically from admixture with streptomycin, dihydrostreptomycin and mannosidostreptomycin. For example, a paper strip may be spotted with a solution of the substances alone or in binary or ternary admixture. The strips are then developed chromatographically in accordance with known methods. The developed paper strips are then placed upon an agar plate, the surface of which has been inoculated with a test organism such as *Staphylococcus aureus*. After a period of time the positions of the resolved antibiotic substances are shown by separate zones of inhibition. The measured ratio of distance traveled along the strip for hydroxystreptomycin compared with streptomycin was 0.50. The ratio of distance for hydroxystreptomycin compared with mannosidostreptomycin was 1.40.

Hydroxystreptomycin may be hydrogenated to produce a novel substance in accordance with the following procedure.

EXAMPLE 3

Hydroxystreptomycin was hydrogenated in aqueous solution at atmospheric pressure in the presence of a platinum oxide catalyst. It took up hydrogen corresponding to two substituent hydrogen atoms. The product, dihydrohydroxystreptomycin has the following probable structural formula in the streptose portion of the molecule:

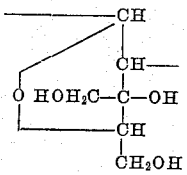

the streptidine and glucosamine portions remaining unchanged. By paper strip chromatography this compound can be separated from admixture with hydroxystreptomycin. The ratio of travel for it compared with hydroxystreptomycin is 0.53.

We claim:

1. A process for producing hydroxystreptomycin which comprises cultivating *Streptomyces griseo-carneus* in a medium comprising an assimilable carbon source and an assimilable nitrogen source, separating the mycelial growth from the medium and separating the hydroxystreptomycin by adsorption and recovering the adsorbed hydroxystreptomycin.

2. A process for producing hydroxystreptomycin which comprises cultivating a hydroxystreptomycin-producing strain of *Streptomyces griseo-carneus* in a medium comprising a proteinaceous source of assimilable nitrogen and an assimilable carbon source for 3–6 days at a temperature in the range of 25°–35° C., separating the mycelial growth from the medium and recovering hydroxystreptomycin by adsorption from the medium followed by elution.

3. A process for producing hydroxystreptomycin which comprises cultivating *Streptomyces griseo-carneus* in an aqueous medium comprising soy meal and glucose for 3–6 days at 25°–35° C., separating the mycelial growth from the medium and recovering hydroxystreptomycin from the medium.

4. The process of claim 2 in which the cultivation is carried out under submerged aerobic conditions.

5. The process of claim 2 in which the adsorbed hydroxystreptomycin is recovered by elution with acidic alcohol, precipitated as the mineral acid salt and subsequently purified by conversion to the helianthate salt.

ROBERT G. BENEDICT.
FRANK H. STODOLA.

REFERENCES CITED

The following references are of record in the file of this patent:

UNITED STATES PATENTS

| Number | Name | Date |
|---|---|---|
| 2,449,866 | Waksman et al. | Sept. 21, 1948 |

OTHER REFERENCES

Kuehl et al.—Science v. 102 (1945) p. 34–35.
Bartz et al.—Jour. Amer. Chem. Soc. v. 68 (1946) pp. 2163–66.
Fried et al.—Jour. Amer. Chem. Soc. v. 69 (1947) pp. 79–86.